United States Patent
Fritts et al.

[11] Patent Number: 5,843,593
[45] Date of Patent: *Dec. 1, 1998

[54] LEAK RESISTANT BATTERY COVER

[75] Inventors: Robert W. Fritts, Thomasville; David M. Revak, High Point, both of N.C.

[73] Assignee: Douglas Battery Manufacturing Company, Winston-Salem, N.C.

[*] Notice: The term of this patent shall not extend beyond the expiration date of Pat. No. 5,683,830.

[21] Appl. No.: 961,701

[22] Filed: Oct. 31, 1997

Related U.S. Application Data

[63] Continuation of Ser. No. 796,423, Feb. 6, 1997, Pat. No. 5,683,830.

[51] Int. Cl.⁶ .................................................. H01M 2/12
[52] U.S. Cl. .............................. 429/84; 429/87; 429/175; 429/176
[58] Field of Search ................................ 429/71, 72, 84, 429/87, 88, 82, 175, 176, 177

[56] References Cited

U.S. PATENT DOCUMENTS

| | | | |
|---|---|---|---|
| 1,605,820 | 11/1926 | Edwards . | |
| 2,505,207 | 4/1950 | Riggs | 136/170 |
| 3,597,280 | 8/1971 | Hennen | 136/177 |
| 3,879,227 | 4/1975 | Hennen | 136/177 |
| 4,207,387 | 6/1980 | Jutte | 429/88 |
| 4,275,128 | 6/1981 | Sano | 429/88 |
| 4,306,002 | 12/1981 | Heiser et al. | 429/84 |
| 4,348,466 | 9/1982 | Elehew et al. | 429/84 |
| 4,371,591 | 2/1983 | Oxenreider et al. | 429/88 |
| 4,374,187 | 2/1983 | Sano | 429/175 |
| 4,486,515 | 12/1984 | Chern | 429/72 |
| 4,486,516 | 12/1984 | Poe | 249/82 |
| 4,600,664 | 7/1986 | Cramer et al. | 429/7 |
| 4,613,550 | 9/1986 | Jergl et al. | 429/53 |
| 4,851,305 | 7/1989 | Kump et al. | 429/84 |
| 5,278,003 | 1/1994 | Francisco | 429/175 |
| 5,281,492 | 1/1994 | Lin | 429/84 |
| 5,380,604 | 1/1995 | Hampe et al. | 429/84 |
| 5,424,146 | 6/1995 | Lin | 429/84 |
| 5,498,488 | 3/1996 | Stocchiero | 429/72 |
| 5,565,282 | 10/1996 | Feres et al. | 429/84 |

FOREIGN PATENT DOCUMENTS

| | | |
|---|---|---|
| 0 763 862 A1 | 3/1992 | European Pat. Off. . |
| 0 503 264 A1 | 9/1992 | European Pat. Off. . |
| 570703 A1 | 11/1993 | European Pat. Off. . |
| 98300835 | 7/1998 | European Pat. Off. . |
| 4216563 A1 | 11/1993 | Germany . |

*Primary Examiner*—Anthony Skapars
*Attorney, Agent, or Firm*—Rhodes, Coats & Bennett, L.L.P

[57] ABSTRACT

The present invention is directed to a leak resistant battery cover for storage batteries. The battery cover provides a labyrinth of passages which provide a path from each cell vent to the atmospheric vent. The labyrinth is configured to provide a portion of each path above a level in which the electrolyte in the respective cells attains when the battery is tipped on any one of its sides or rotated ninety (90) degrees from an upright position. The labyrinth configuration prevents electrolyte from reaching the atmospheric vent and spilling out of the battery.

25 Claims, 12 Drawing Sheets

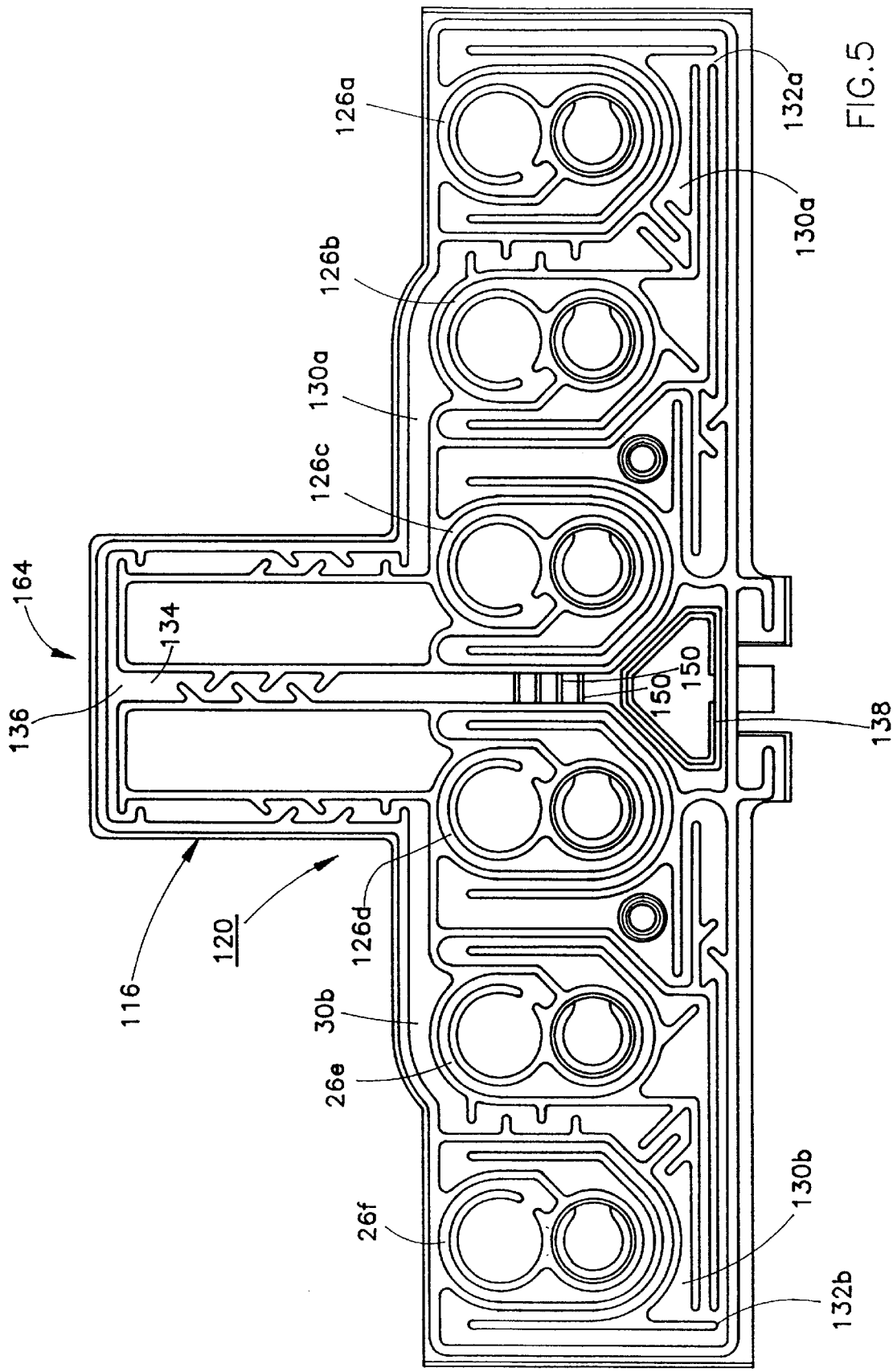

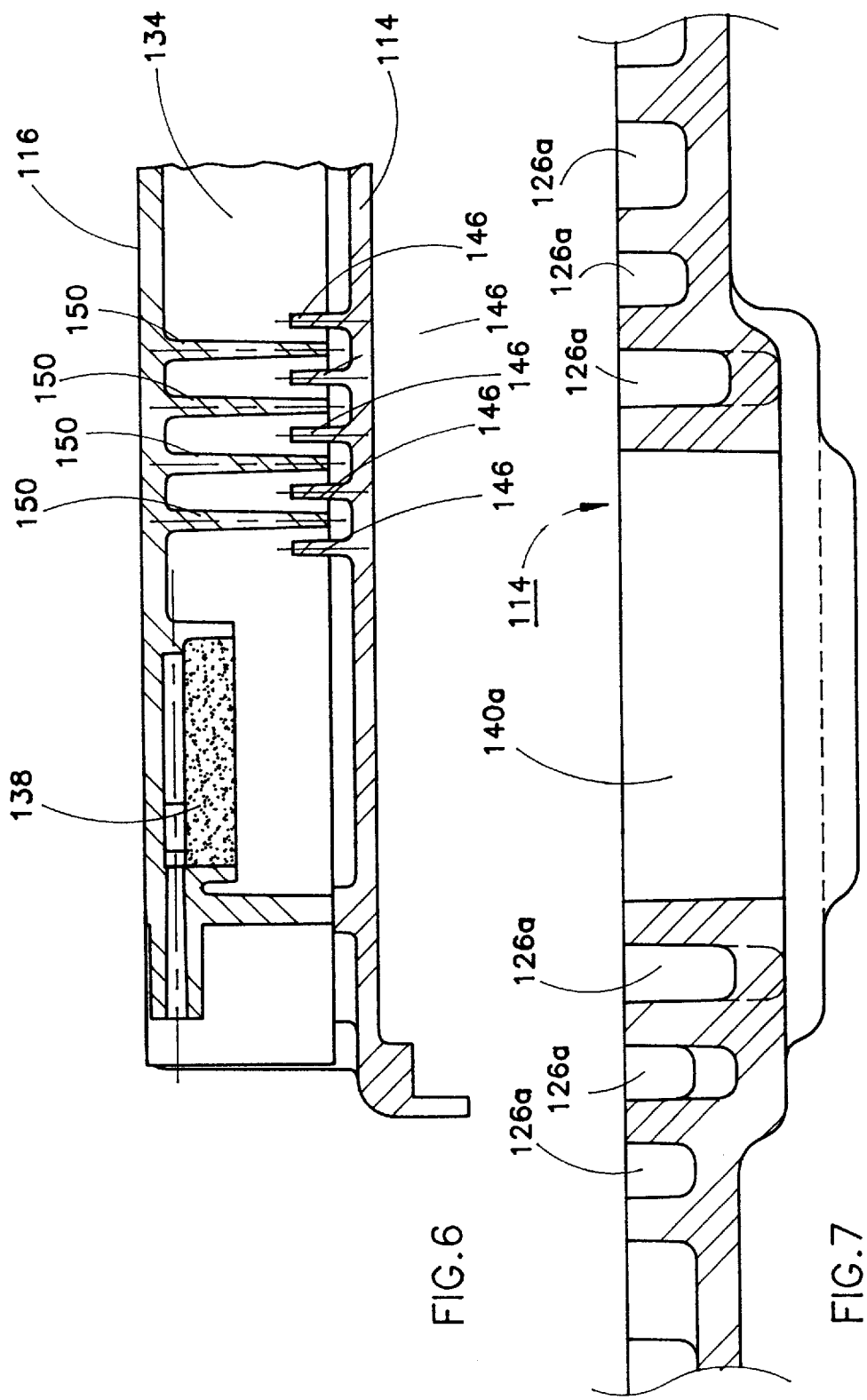

LEAK RESISTANT BATTERY COVER

This application is a continuation of application No. 08/796,423, filed Feb. 6, 1997, now U.S. Pat. No. 5,683,830.

BACKGROUND OF THE INVENTION

(1) Field of the Invention

The invention relates to a storage battery cover, and more particularly to a storage battery cover offering added protection against leakage when a battery using the cover of the invention is tipped to any one of its sides or inverted.

(2) Description of the Prior Art

Conventional storage batteries include a battery housing having a housing and a cover for closing an open top end of the casing. The battery housing is a rectangular casing having multiple compartments or cells for receiving cell plates and electrolyte therein. The cover device is heat sealed to an open top end of the battery housing casing.

The cover device often includes a main cover part and a sub-cover part. The main cover part has a horizontally disposed plate body with a top face formed by a rectangular confining wall. The confining wall is divided by multiple partitions and associated chambers. The main cover further includes multiple service ports for pouring electrolyte into respective cell compartments within the casing and multiple degassing vents and drain-back return holes associated with each cell.

The sub-cover is integrally secured to the main cover after electrolyte has been poured into the cell compartments through the service ports. The sub-cover part is heat sealed to the main cover part along its perimeter and at top edges of the partitions and chamber walls. The chambers and partitions ultimately form enclosed chambers and associated paths from the cell vent and return hole of each cell to multiple atmospheric vents. The chambers typically include relatively large containment areas for holding electrolyte spilled into the battery cover when the battery is tipped.

In operation, heat that is generated during electrolysis causes the electrolyte and water in the electrolyte to evaporate. This evaporation is referred to as "gassing". Gassing of the cell occurs at any point the battery reaches the hydrogen over-voltage, producing bubbles that break at the surface introducing a mist into the venting gas stream. In conventional batteries, the vaporized electrolyte was released to atmosphere through an atmospheric vent in the cover device. Loss of electrolyte through the atmospheric vent requires replenishing electrolyte in the battery housing periodically. In order to overcome electrolyte loss, a battery housing with a cover capable of recovering the vaporized electrolyte was developed, thereby obviating the need for replenishing the electrolyte in the battery housing.

When the electrolyte in the cell compartments undergo electrolysis and evaporates due to the heat that is generated, the vaporized electrolyte flows into the path formed in the cover through the cell vents or drain-back holes. Since the interior of the cover is exposed to the atmosphere via the atmospheric vent, the interior temperature of the cover is less than that of the vaporized electrolyte entering the cover. Thus, heat transfer occurs so that the vaporized electrolyte condenses, and the resulting condensate flows back into the corresponding cell compartments via the drain-back holes. The paths are often sloped towards the drain-back holes to further facilitate the return of electrolyte to the respective cells. Since the vaporized electrolyte is recovered instead of released to atmosphere, there is no need to periodically replenish the electrolyte in the battery housing.

Although these batteries prevent electrolyte loss during normal operation, the battery will leak, and in many cases pour, electrolyte from the atmospheric vents when the battery is tipped to one side, inverted or agitated. Batteries are often placed in a non-upright position during shipping, handling or accidents, such as car wrecks. A significant threat to person and property arises when electrolyte leaks from a battery.

Various approaches have been taken in the past to deal with the problem of electrolyte spilling or leaking from a battery when it is tipped to any one of its sides. Many of the arrangements are acceptable in situations where the battery is tilted to its side and not subjected to vibration or other forms of movement. However, the related art has yet provided a cost effective battery cover providing total steady state leak protection when the battery is tipped to one side and substantial resistance to electrolyte leakage when subjected to vibration, agitation or inversion.

U.S. Pat. No. 1,605,820 to Edwards discloses a multilevel chamber configuration for each cell. The chamber includes two opposed inclined partitions for preventing electrolyte spills when the battery is tipped to one side. The chamber configuration provides no inverted leak protection. Furthermore, the large chamber configuration provides very limited protection against vibration or agitation when tipped to one side.

U.S. Pat. No. 3,597,280 to Hennen disclosed a multiple vent plug assembly for merely reducing spillage when a battery is partially tipped or completely inverted. The plug assembly incorporates a multi-chamber configuration designed to contain a substantial portion of electrolyte prior to spilling the electrolyte to atmosphere. The Hennen patent does not disclose a chamberless cover design or provide substantial leak protection over extended periods of time.

U.S. Pat. No. 4,348,466 to Elehew et al. discloses a large rectangular chamber configuration having an inlet in communication with a respective cell. Each chamber has an outlet off to one side of and below the inlet. A passage associated with the chamber outlet is provided for containing and holding electrolyte. The passage has an outlet in communication with an atmospheric vent. The arrangement is such that the chambers and associated passages are of sufficient volume to retain the amount of electrolyte displaced into them when equilibrium is achieved between levels of electrolyte in the cells and respective chambers and passages.

The Elehew et al. patent requires that a portion of the passage be above the chamber inlet regardless to which side the battery is tipped. When the chambers and the passages fill with electrolyte, an airlock is developed which prevents additional flow of electrolyte from the cell into the chamber and passage configuration.

The Elehew et al. patent provides no leak protection when the battery is inverted and provides only steady state protection when the battery is tipped to one side. As seen from viewing the chamber and passage configuration of the Elehew et al. patent, when a battery using the Elehew et al. cover is tipped on various sides and vibrated or agitated, it is very likely that electrolyte will spill out of the chamber and run into the passage to the venting area. The large chambers and passage configuration in Elehew et al. allows substantial amounts of electrolyte to spill into the battery cover; thus, increasing the likelihood of electrolyte being spilled into the venting area and ultimately leaking outside the battery system. The Elehew et al. patent is directed towards preventing leak protection at a steady-state equilibrium when the battery is tipped to one side. Having substantial amounts of electrolyte in the cover and limited flow restriction substantially increases the likelihood that electrolyte will spill if the battery is vibrated or agitated after arriving at an equilibrium in a non-upright position.

Similar configurations are shown in U.S. Pat. No. 5,380,604 to Hampe et al. and U.S. Pat. No. 5,424,146 to Lin. Both patents disclosed leak resistant battery covers having chambers associated with each cell. The chambers have guides for controlling the flow of acid. However, each cover is designed to allow a significant amount of electrolyte to flow into the respective cover and provides no protection against electrolyte leakage when the battery is inverted and very limited protection when vibrated or agitated.

The German Patent No. 4,216,563 discloses a dual section cover having a chamber associated with each cell. Each chamber is sized so that when the battery is tipped or inverted, no more acid from a respective cell enters the gas collection chamber than the chamber can contain. Although the German patent attempts to address inverted leak protection, allowing such substantial amounts of electrolyte to flow out of the cells and into the cover substantially increases the risk of electrolyte leaking outside of the battery system.

Aside from the above arrangements, far more complex arrangements are known which are used on aircraft batteries and the like which not only deal with the problem of electrolyte flowing from the cell when tipped to any one of its sides, but also maintains the battery in operation when completely inverted. These designs are not cost effective for the majority of battery applications. Accordingly, there remains a need to provide an anti-spill battery cover for liquid electrolyte batteries which is relatively inexpensive to manufacture, prevents spillage of electrolyte when tipped toward or onto any one of its sides, provides additional resistance to spillage when vibrated or agitated while tipped toward or onto any one of its sides, and prevents spillage of electrolyte when the battery is substantially or completely inverted. Furthermore, there is a need for a chamberless battery cover of limited volume capable of forming an air-lock in a short period of time after tipped or inverted in order to minimize the amount of electrolyte entering the cover and significantly reducing the potential of electrolyte reaching an atmospheric vent. A need exists for a chamberless, leak resistant battery cover using only one atmospheric vent in order to further reduce the likelihood of electrolyte spills. A need remains for a battery cover having the above features in order to prevent harm to person and property caused by contact with electrolyte or from the potential of fire and explosion if exhaust gases are ignited.

SUMMARY OF THE INVENTION

The present invention is directed to a leak resistant battery cover for storage batteries. The battery cover provides a labyrinth of passages providing a path from each cell vent to the atmospheric vent. The labyrinth is configured to provide a portion of each path above a level in which the electrolyte in the respective cells attains when the battery is tipped on any one of its sides or rotated ninety (90) degrees from an upright position. The labyrinth configuration prevents electrolyte from reaching the atmospheric vent and spilling out of the battery.

The passages of the labyrinth may include portions extending horizontally from a passage wall towards the center of the passage. These horizontally extending passages are generally perpendicular to the passage wall or angled in a manner obstructing the flow of electrolyte toward the atmospheric vent. Preferably, the horizontally extending passages alternate from opposing sides of the passage. The labyrinth configuration of the current invention provides improved leak protection over the above discussed prior art when the battery is tipped to one side. Additionally, the substantially convoluted passages provide inverted leak resistance.

The convoluted passages in conjunction with the partitions operate to form an air-lock between the cell vent and the atmospheric vent. By providing such a convoluted path for air to travel, an air-lock is formed in the passages. When air is prevented from entering the battery, additional electrolyte is prevented from leaving each cell, entering the labyrinth and ultimately leaking through the atmospheric vent.

The passages of the labyrinth may also include portions extending vertically from a passage floor or ceiling. The vertically extending passages provide enhanced leak protection when the battery is inverted. Preferably. the vertically extending partitions alternate from the floor and ceiling and the portions extending from the ceiling are substantially longer than the partitions extending from the floor in order to provide a greater electrolyte barrier when inverted. The vertically extending partitions aid in forming an air-lock and preventing air from entering the cells.

Accordingly, one aspect of the current invention is to provide a leak resistant battery cover for a lead acid battery of the type including a housing having a plurality of cells containing electrolyte and a plurality of partition walls separating the cells. The cover includes: (1) a cover having a floor and ceiling forming an interior area therebetween, wherein the cover includes a bottom adjacent, the battery housing wherein the cover sealably engages the housing and partition walls; (2) a plurality of cell vents in and extending through the bottom of the cover wherein each cell vent is adapted to communicate gases within the corresponding cells of the battery to the interior area of the cover; (3) an atmospheric vent on the cover adapted to communicate gases from within the interior area of the cover to atmosphere; (4) a labyrinth system between said floor and ceiling in the interior area of the cover form a plurality of narrow passages wherein the passages formed of a plurality of convoluted paths communicating each cell vent to the atmospheric vent and each cell vent communicates substantially immediately with one the passage of the labyrinth; and (5) a plurality of cell drains on said floor and extending through the bottom of the cover wherein the cell drains communicate with the passages, and the cell drains are adapted to communicate liquid in the passages to respective cells. The passages of the labyrinth are so arranged that each of said paths has a branch above an electrolyte level for the corresponding cell when the battery is rotated as much as ninety degrees from an upright position.

Another aspect of the current invention is to provide a labyrinth adapted to provide for two or more of the passages communicating with each cell vent to converge into a common passage in the labyrinth prior to the atmospheric vent, wherein the path from each cell vent to the atmospheric vent is common for respective cells. Furthermore, all of the passages communicating with each cell vent may converge into a final common passage in the labyrinth prior to the atmospheric vent.

Still another aspect of the current invention is to provide a labyrinth having passages sloped towards the cell drains to allow liquid electrolyte in the passages to flow into respective cells. Additionally, the cell vent and the cell drain are an integrated vent and drain back unit.

Another aspect of the current invention is to provide a labyrinth of passages which are substantially convoluted and substantially or entirely encircle each respective cell vent. Preferably, each path to atmosphere for each cell has a branch running substantially near a portion of the periphery of the cover.

Still another aspect of the current invention is to provide a labyrinth wherein each path formed by the passages form one path to atmosphere for each cell. Various portions of each path may be common to another path. Additionally, the passages of the labyrinth may be adapted to provide a path from each cell vent to the atmospheric vent which crosses the lateral axis twice.

Another aspect of the current invention is to provide a battery cover having a transverse axis perpendicular to the lateral axis with passages adapted to provide a path from each cell vent to the atmospheric vent having a portion substantially along the transverse axis. Furthermore, the battery may have each cell vent, each cell drain and the atmospheric vent on one side of the lateral axis. Generally, the battery cover is adapted for a six cell lead acid battery wherein the battery cover includes six cell vents, six cell drains and one atmospheric vent. Preferably, the battery cover is constructed of a lower cover portion and an upper cover portion. The lower and upper cover portions sealably engage one another to form the labyrinth system.

Another aspect of the current invention is to provide a cover including a second atmospheric vent wherein approximately half of the cell vents communicate with each atmospheric vent.

Yet another aspect of the current invention is to provide the passages of the labyrinth with a plurality of horizontally extending partitions extending into the passages to provide resistance to any flow of liquid, towards the atmospheric vent when the battery is toppled. The horizontally extending partitions extend from interior sides of the passages of the labyrinth and are often slanted against a direction of flow of electrolyte toward the atmospheric vent to provide further resistance against the flow of liquid electrolyte towards the atmospheric vent when the battery is toppled. Preferably, the horizontally extending partitions alternate from opposing interior sides of the passages of the labyrinth.

Still another aspect of the current invention is to provide the passages of the labyrinth with a plurality of vertically extending partitions extending into the passages to provide resistance to the flow of liquid towards the atmospheric vent. The vertically extending partitions aid in restricting electrolyte flow in the passages and in providing an airlock between the cells and the atmospheric vent when the battery is inverted. The vertically extending partitions may extend from either an upper or lower portion of the passages. Preferably, the upper and lower vertically extending partitions alternate along the passage. The vertically extending partitions extending from the upper portion of the passage extend below a level in which the vertically extending partitions extending from the lower portion extend. The vertically extending partitions provide an obstructed path along the passage.

Yet another aspect of the current invention is to provide the common passage of the labyrinth with a plurality of substantially vertically extending partitions adapted to provide resistance to the flow of liquid towards the atmospheric vent. The vertically extending partitions extend from an upper and lower portion of the common passage and alternate along the common passage. The vertically extending partitions extending from the upper portion of the common passage extend below a level in which the vertically extending partitions extending from the lower portion extend. The partitions provide an obstructed path to the atmospheric vent. The vertically extending partitions extending from the upper and lower portions of the common passage are preferably substantially adjacent along the common passage.

Still another aspect of the current invention is to provide the common passage of the labyrinth with an entrance, wherein the entrance includes a vertically extending partition adapted to provide resistance to the flow of liquid towards the atmospheric vent. The vertically extending partition at the entrance further aids in providing an airlock between the cells and the atmospheric vent when the battery is inverted.

Another aspect of the current invention is to provide a leak resistant battery cover for a lead acid battery of the type including a housing having a plurality of cells containing electrolyte and a plurality of partition walls separating the cells, the cover includes: (1) a cover having floor and ceiling forming an interior area therebetween, wherein the cover includes a bottom adjacent the battery housing wherein the cover sealably engages the housing and partition walls; (2) a plurality of cell vents in and extending through the bottom of the cover wherein each cell vent is adapted to communicate gases within the corresponding cells of the battery to the interior area of the cover; (3) an atmospheric vent on the cover adapted to communicate gases from within the interior area of the cover to atmosphere; (4) a labyrinth system between said floor and ceiling in the interior area of the cover form a plurality of narrow passages wherein the passages form a plurality of substantially convoluted paths to communicate each cell vent to the atmospheric vent wherein each cell vent communicates substantially immediately with one passage of the labyrinth; and (5) a plurality of cell drains on said floor and extending through the bottom of the cover wherein the cell drains communicate with the passages wherein the cell drains are adapted to communicate liquid in the passages to respective cells, and the passages of the labyrinth are so arranged that each of said paths has a branch above an electrolyte level for the corresponding cell when the battery is rotated as much as ninety degrees from an upright position, wherein the labyrinth is adapted to provide for two or more of the passages communicating with each cell vent to converge into a common passage in the labyrinth prior to the atmospheric vent wherein the path from each cell vent to the atmospheric vent has a portion in common with one or more other said paths.

BRIEF DESCRIPTION OF THE DRAWINGS

FIG. 5 is a bottom view of the labyrinth of passages in the outer cover of the leak resistant battery cover constructed according to the present invention.

FIG. 6 is a partial cross-sectional view of a joined intermediate and outer cover along live 6—6 illustrating the upper and lower vertically extending partitions and the atmospheric vent constructed according to the present invention.

FIG. 7 is a partial cross-sectional view of the intermediate cover, taken along line 7—7 shown in FIG. 2, for illustrating the sloping passages of the labyrinth constructed according to-the present invention.

DESCRIPTION OF THE PREFERRED EMBODIMENTS

Figure 1:
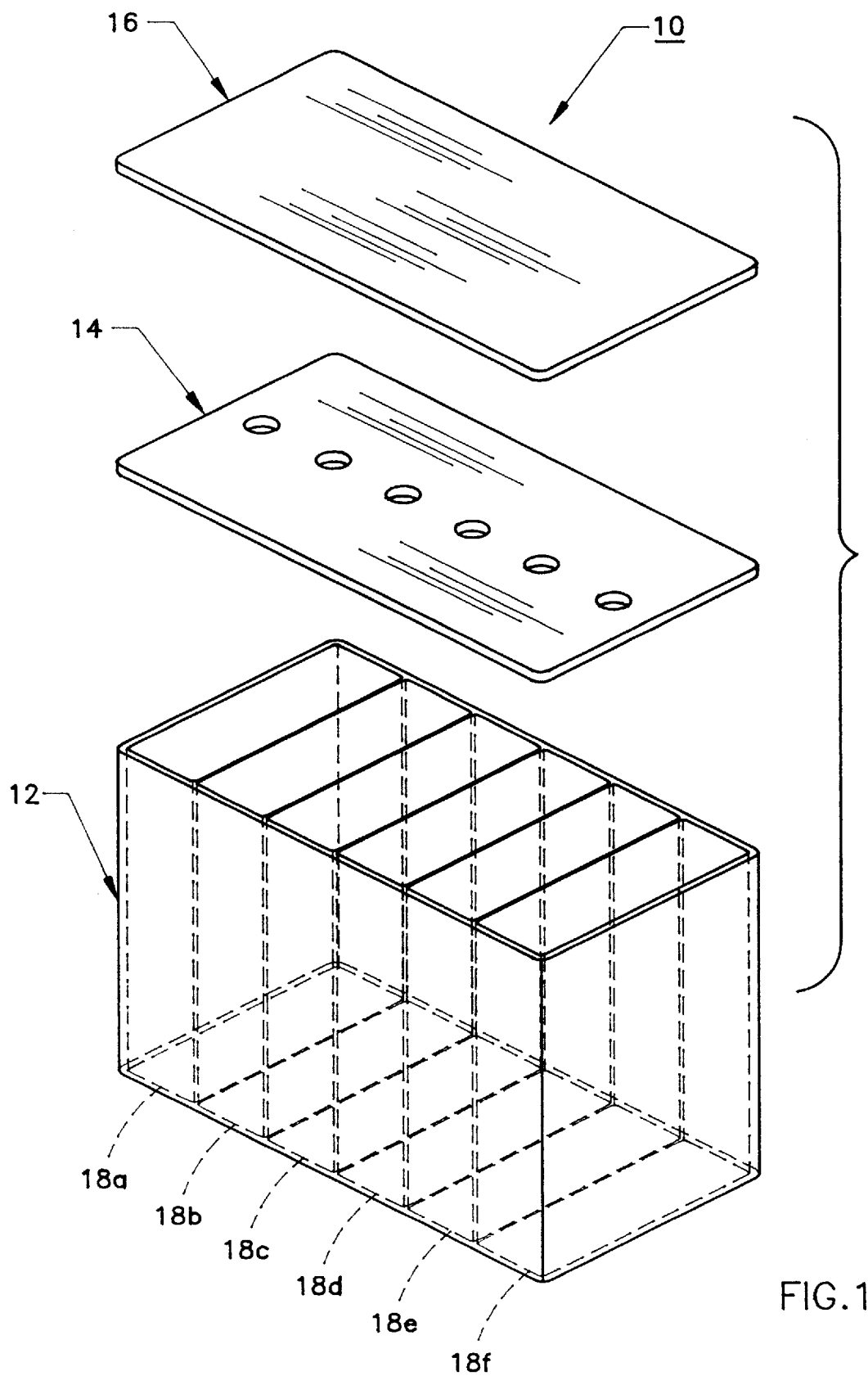
FIG. 1 is a perspective view of a battery having a leak resistant battery cover constructed according to the present invention.

In the following description, like reference characters designate like or corresponding parts throughout the several views. Also in the following description, it is to be understood that such terms as "forward", "rearward", "left", "right", "upwardly", "downwardly", and the like are words of convenience and are not to be construed as limiting terms.

Referring now to the drawings in general, and FIG. 1 in particular, it will be understood that the illustrations are for the purpose of describing a preferred embodiment of the invention and are not intended to limit the invention thereto. As best seen in FIG. 1, a battery, generally designated 10, is shown constructed according to the present invention. The battery 10 includes three major subassemblies: a battery housing 12, an intermediate cover 14, and an outer cover 16. The intermediate cover 14 is normally heat sealed or glued to housing 12 and the outer cover 16 is normally heat sealed to the intermediate cover 14. The battery housing 12 typically includes a plurality-of partitioned cells 18A–F which are substantially isolated from each other when the covers 14, 16 are sealed onto the housing 12. Since the embodiments of the invention are directed towards providing a leak resistant battery cover it is understood that various types of venting devices may be incorporated in the leak resistant arrangement and thus particular venting arrangements are not described in detail.

Figure 2:
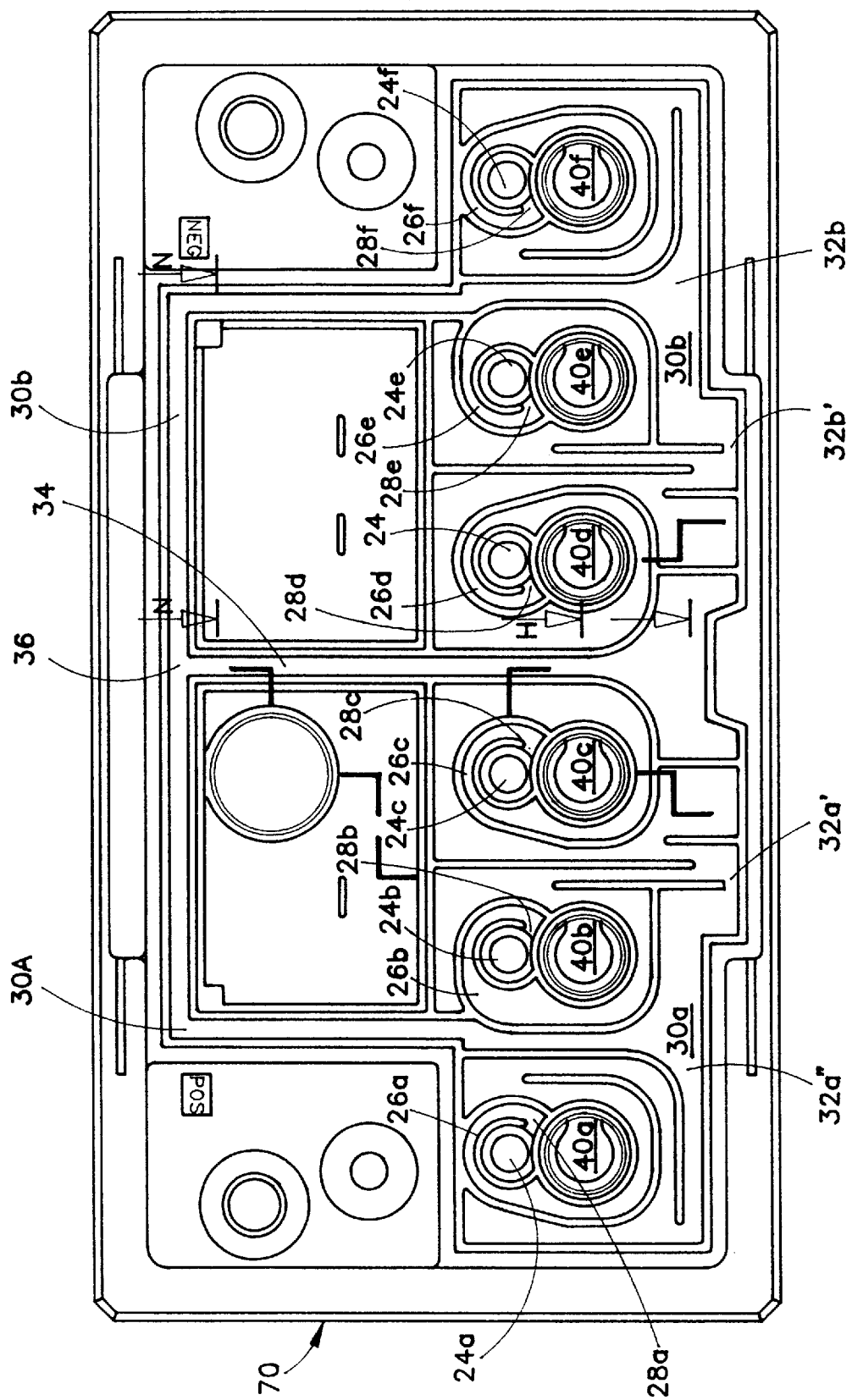
FIG. 2 is a top view of the labyrinth of passages in an intermediate cover of a leak resistant battery cover constructed according to the present invention.
Figure 3:
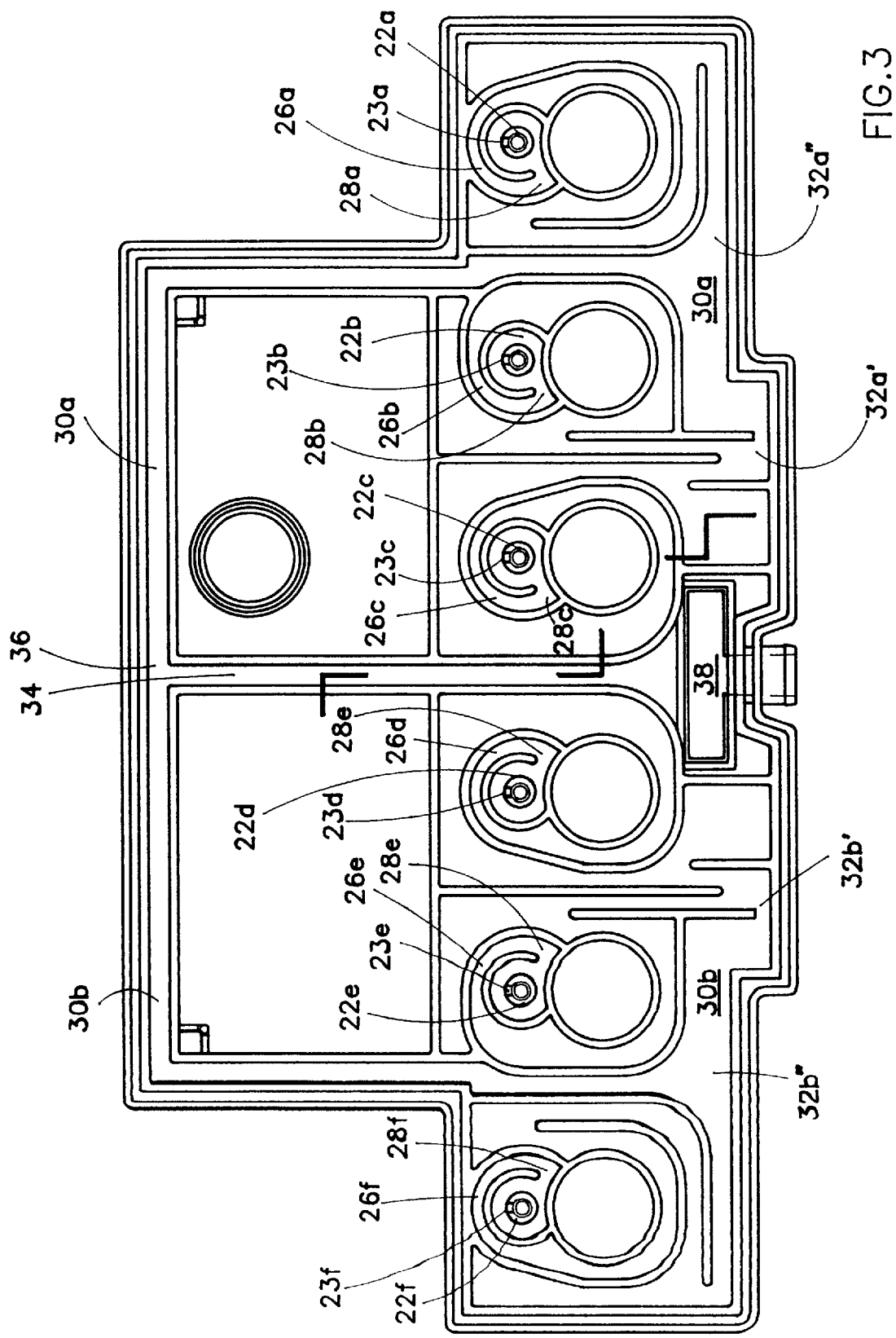
FIG. 3 is a bottom view of the labyrinth of passages in an outer cover of the leak resistant battery cover mating with the intermediate cover shown in FIG. 2.

The intermediate cover 14 and outer cover 16 are designed to form an enclosed labyrinth of passages 20 when the covers 14, 16 are joined. Turning now to FIG. 2, a top view of the intermediate cover 14 is shown. A cell vent 22 and cell drain 24 (shown in FIG. 3) are provided for each battery cell 18. Preferably, the drain 24 is an aperture in the intermediate cover 14 and the vent 22 is formed by a slotted tube 23A–F extending downward from the outer cover 16 into and partially through the aperture forming the drain. This drain/vent technique is conventional in the art. The cell vent 22 allows for the escape of electrolyte from each cell 18 of the battery 10. In normal operation, the electrolyte gas will condense back into liquid form and drain back into the cell 18 through the cell drain 24. Thus, in a typical 12-volt automotive or vehicle battery 10, there are six cells 18A–F, cell vents 22A–F, and cell drains 24A–F.

When electrolyte gas escapes through cell vent 22, it communicates into an initial passage 26 of the labyrinth 20 through a passage entrance 28. Each cell 18 is associated with one initial passage 26A–F and one passage entrance 28A–F. The initial passage 26 ultimately leads to atmosphere. Multiple initial passages 26A–F converge into a first common passage 30 at a first convergent point 32. Although there may be many convergent points, the first embodiment initially brings two passages 26B–C, 26D–E together at the first convergent point 32A', 32B'. The paths from the outermost initial passages 26A, 26F join at points 32A" and 32B", respectively. Thus, the first common passages 30A', 30B' form a portion of the path to atmosphere for three cells 18A–C, 18D–F, respectively. The two first common passages 30A', 30B' ultimately combine to form a final common passage 34 at a final convergence point 36. The path to atmosphere for each cell 18 is provided by the final common passage 34. The final common passage 34 leads to atmosphere via an atmospheric vent 38 placed near the end of the final common passage 34. In the preferred embodiment, the atmospheric vent 38 is a porous disk located on the outer cover 16.

The labyrinth of passages 20 is designed to form a very convoluted path to atmosphere. The initial passages 26A–F substantially encircle their respective cell vents 22A–F, service ports 40A–F, and typically includes a portion substantially near and along the perimeter portion of the battery prior to reaching the first convergent point 32. The perimeter portion of the electrolyte path may also be provided in the first common passage 30 after the first convergent point 32. It is important for the labyrinth of passages 20 to form very convoluted paths prior to reaching the atmospheric vent 38.

Figure 4:
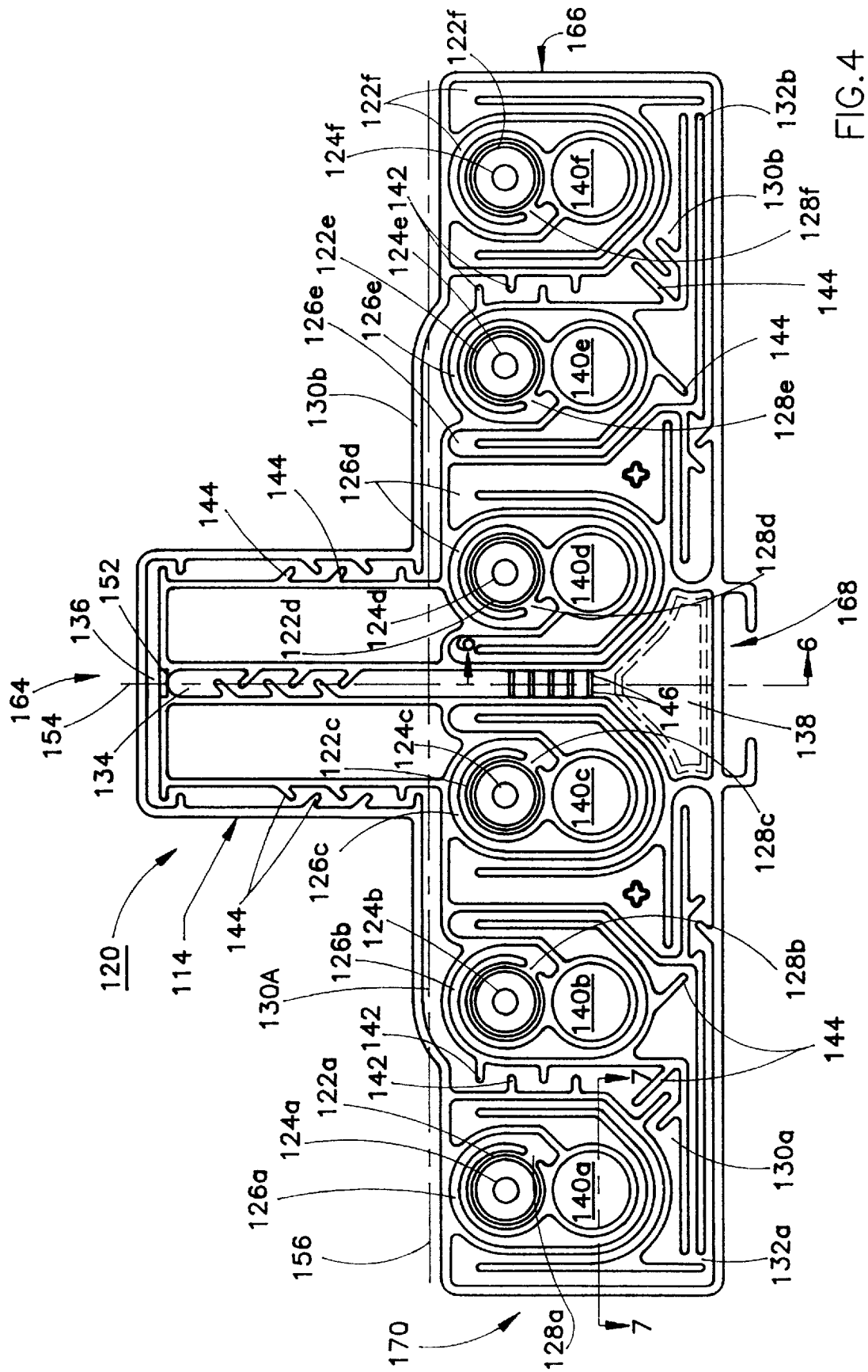
FIG. 4 is a top view of a second embodiment of an intermediate cover constructed according to the present invention.

FIG. 4 shows a second embodiment of the battery cover constructed according to the present invention. As with the embodiment in FIG. 2, electrolyte gases escape through cell vents 122, communicate into an initial passage 126 of the labyrinth 120 through a passage entrance 128 and converges into a first common passage 130A, 130B at a first convergent point 132A, 132B. The three initial passages 126A–C, 126D–F for each side of the battery converge into the common passages 130A, 130B, at convergence points 132A, 132B, respectively. The common passage 130A ultimately combines with a similar common passage 130B from the other half of the battery to form a final common passage 134 at a final convergent point 136.

Figure 13:
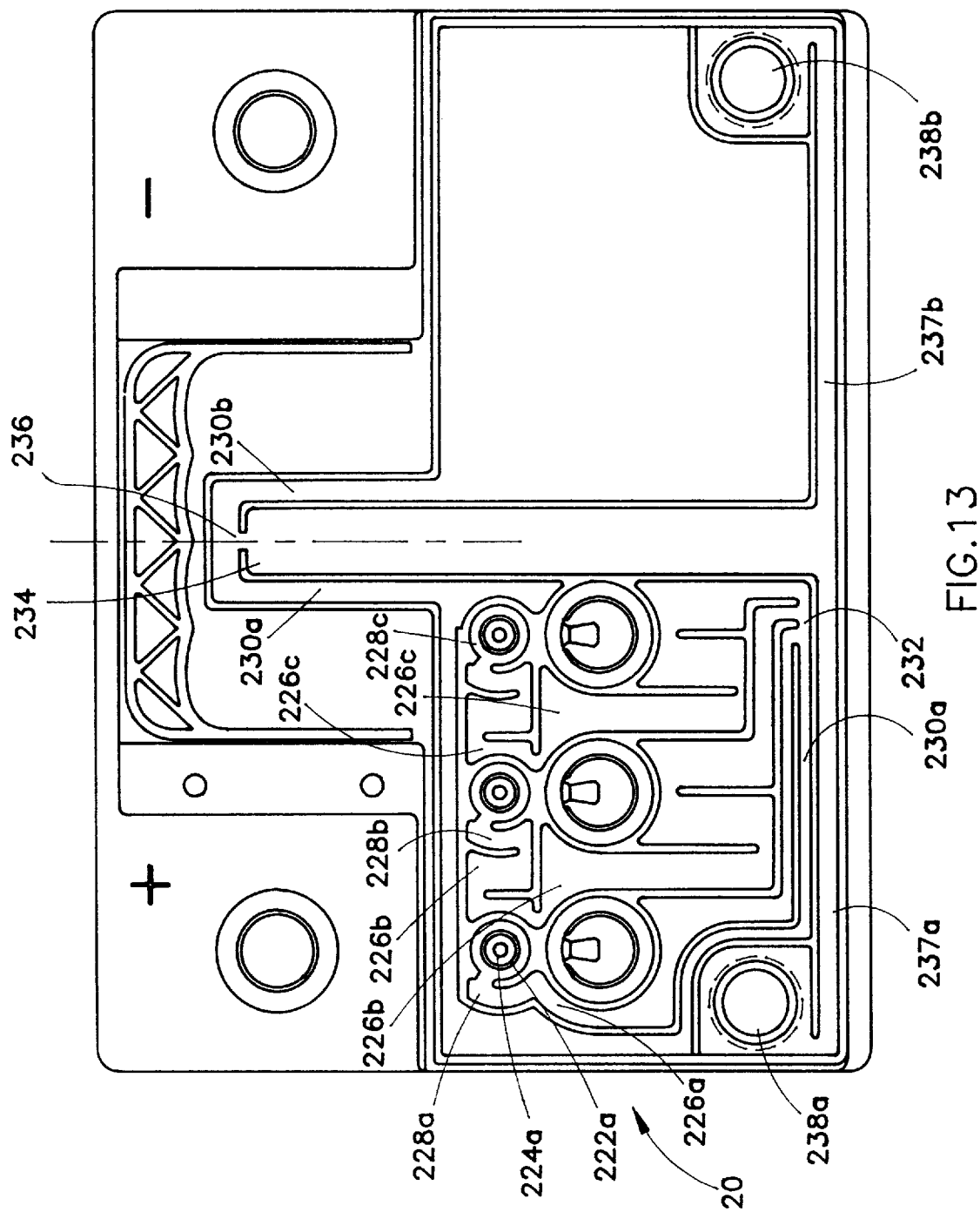
FIG. 13 is a top view of a third embodiment of an intermediate cover constructed according to the present invention.

FIG. 13 shows yet a further cover embodiment. Similar to the earlier embodiments, the third embodiment allows electrolyte gas to escape through a cell vent 222 into an initial passage 226 through a passage entrance 228. In the third embodiment, the initial passages 226A, 226B and 226C converge into a first common passage at substantially the same point 232A, 232B. The first common passage 230A, representing the flow path for one-half of the battery, converges with the first common passage 230B, representing the other half, into a final common passage 234 at final convergent point 236. The third embodiment differs from the earlier embodiments in that the final common passage 234 ultimately splits into diverging passages 237A, 237B. Each diverging passage 237 communicates with atmospheric vents 238A, 238B, respectively. This arrangement is preferred in dual atmospheric vent embodiments. The horizontal and vertical partitions are selectively optional in any of the embodiments.

Returning now to FIG. 4, located along the various passages 126, 130 and 134 are a plurality of perpendicular horizontally extending partitions 142 and angled horizontally extending partitions 144. The partitions 142, 144 provide a substantially obstructed path for electrolyte gas or liquid along the passages 126, 130 and 134. The angled horizontally extending partitions 144 are preferably angled against the direction of electrolyte flow towards the atmospheric vent 138. The horizontally extending partitions 142, 144 extend from the side of the passages 126, 130, 134 towards the center thereof. Preferably, these partitions 142, 144 are arranged to alternate along the passages 126, 130, 134 to provide more effective path obstruction without blocking the path entirely. Furthermore, the horizontally extending partitions 142, 144 are positioned in a manner ensuring that electrolyte condensate will not lodge between the partitions 142, 144 or anywhere along the electrolyte path to effectively block the electrolyte path while in normal operation.

Referring to FIGS. 4 and 5, the electrolyte path may also include a plurality of upper vertically extending partitions 150 (shown only in FIG. 5) and lower vertically extending partitions 146 (shown only in FIG. 4) extending from an upper and lower portion of a passage, respectively. The upper vertically extending partitions 150 extend downwardly from the upper portion of the passage 134 while the lower vertically extending partitions 146 extend upwardly from the passage 134. Preferably, the vertically extending partitions 146, 150 are located along the final common passage 134 prior to reaching the atmospheric vent 138. Also, a lower vertically extending entrance partition 152 may be placed at the final convergence point 136. The vertically extending partitions 146, 150, 152 extend across the width of the entire passage 134. The vertically extending entrance partitions 152 (shown only in FIG. 4) and the lower vertically extending partitions 146 extend from the intermediate cover 114. The upper vertically extending partitions 150 extend from the outer cover 116 and between the lower vertically extending partitions 146 on the intermediate cover 114.

FIG. 6 depicts a cross-sectional view along the final common passage 134 formed by joining the intermediate cover 114 with the outer cover 116. When the upper and lower vertically extending partitions 146, 150 are alternatingly positioned, a series of "up-and-overs" are formed along the electrolyte path. As depicted, the lower vertically extending partitions 146 and upper vertically extending partitions 150 extend past the ends of the respective partitions 146, 150. Preferably, the upper vertically extending partitions 150 extending from the outer cover 116 are substantially longer than the lower vertically extending partitions 146 extending from the intermediate cover 114. Having the vertically extending partitions 146, 150 configured in this manner provides greater electrolyte leakage protection while inverted. Inverted leak protection is discussed in further detail below. The final common passage 134 extends along a transverse axis 154 bisecting the length of the battery.

As best seen in FIGS. 4 and 5, the upper portion of the intermediate cover 114 is configured to substantially mirror the lower portion of the outer cover 116 to form the labyrinth of passages 120 and the plurality of various partitions placed throughout. Once the covers 114, 116 are sealed, the passages 126, 130, 134 seal and form enclosed paths.

The passages 126, 130, 134 which make up the path from the passage entrance 128 to the atmospheric vent 138 are configured to continuously slope from the atmospheric vent 138 to the respective drain hole 124A–F of each cell 18A–F. This sloping configuration returns the electrolyte condensate back to the cells 18A–F after the electrolyte gas has condensed back into a liquid during normal operation. The angled horizontally extending partitions 144 are oriented in a manner preventing entrapment of electrolyte condensate during its return to a cell 18A–F. FIG. 7 is a cross-sectional view of the initial passage 126A and depicts the continuously sloped elevation of the initial passage 126A as it substantially circles and re-circles the cell vent 122 and service port 140.

Figure 8:
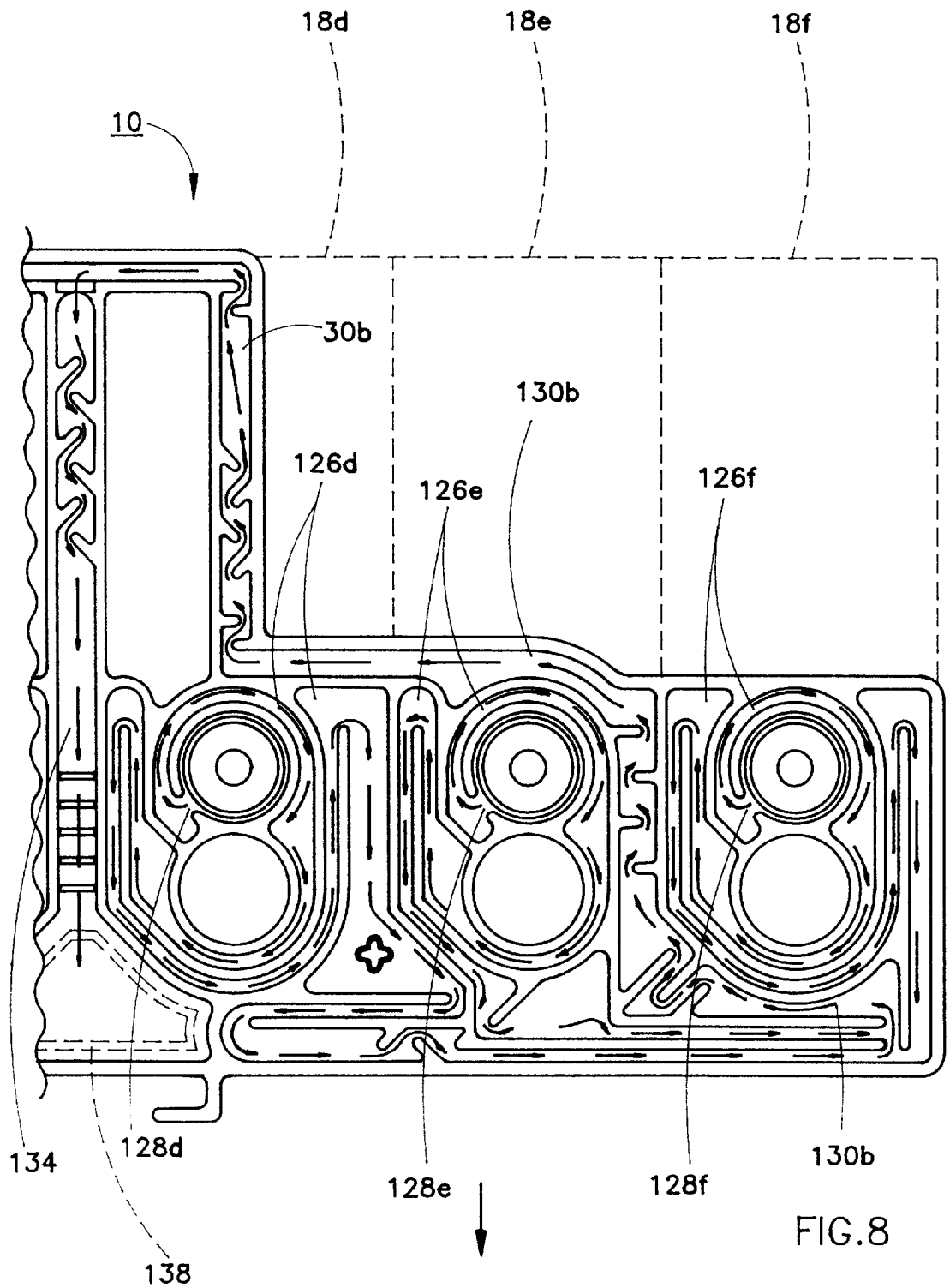
FIG. 8 is a partial top perspective depicting electrolyte gas flow according to the present invention.

As best seen in FIG. 8, in normal operation of the battery, electrolyte gas will rise from the cells 18A–F and enter the initial passage 126A–F through the passage entrance 128A–F. The arrows show the path the electrolyte gas would take from each respective passage entrance 128A–F of each cell 18A–F to the atmospheric vent 138. The arrows highlight the highly convoluted path to atmosphere associated with each cell 18A–F. Note that the electrolyte will condense well before reaching the atmospheric vent 138. The path to atmosphere for the cells 18A–F not depicted is a mirror image of the path for the cells 18A–F depicted in FIG. 8.

As best seen in FIGS. 9–12, the labyrinth of passages 120 is configured to provide a path from each cell vent 122A–F and drain hole 124A–F to the atmospheric vent 138. Each path is configured to have a portion above the electrolyte level 162 when the battery is tipped to any one of its sides 164, 166, 168 and 170 or up to ninety (90) degrees from an upright position.

Figure 9:
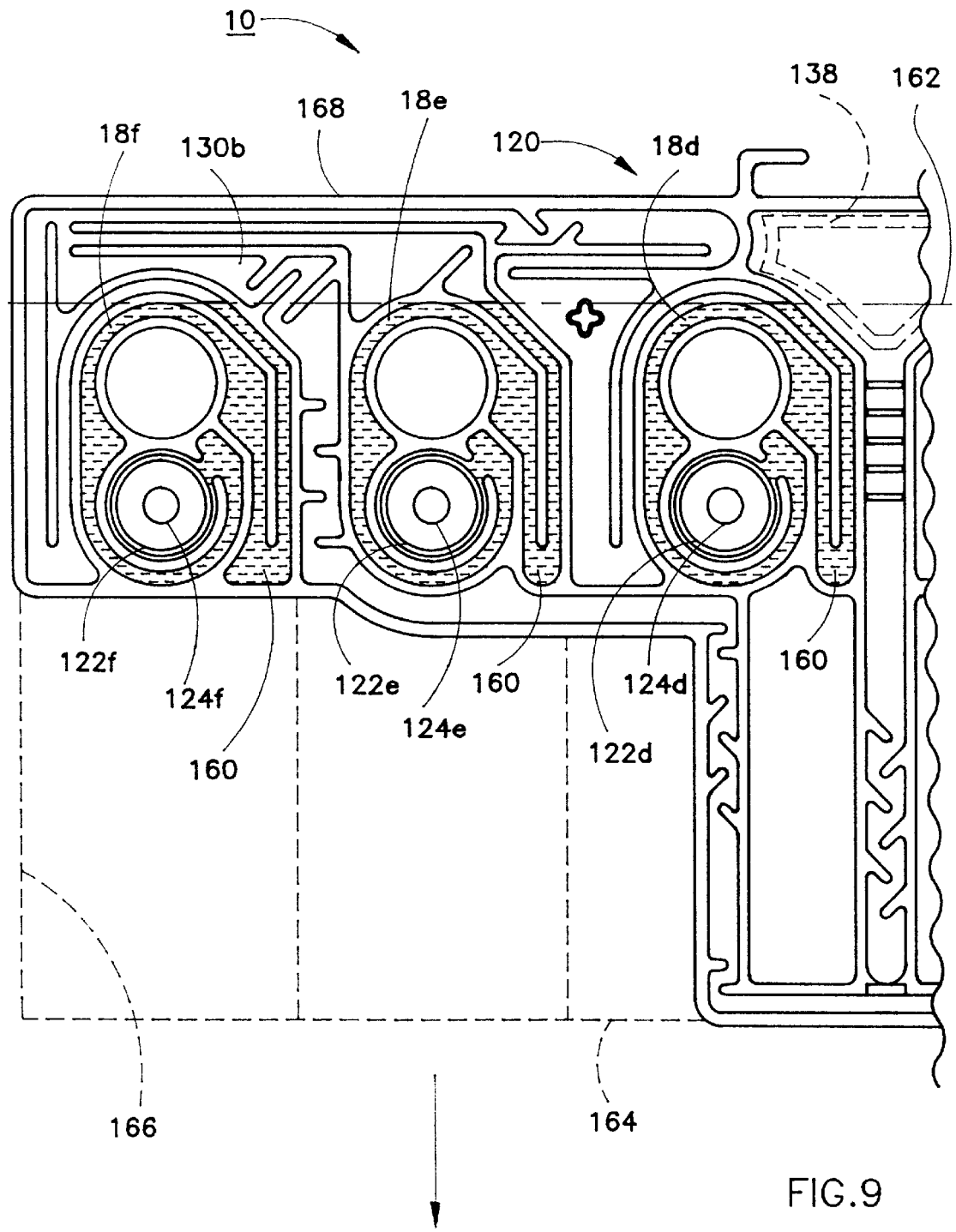
FIG. 9 is a partial cross-sectional view of a battery cover constructed according to the present invention illustrating electrolyte level in the labyrinth of passages when the battery is tipped onto one side in the direction of the arrow.

Referring to FIG. 9 in particular, a partial cross-sectional view of the labyrinth of passages 120 is shown when the battery is tipped onto side 164. The effective electrolyte level in the cells 18A–F is shown at line 162. When the battery 10 is tipped to one of its sides, electrolyte 160 will spill into the initial passage 126A–F and any other passages, such as the first common passage 130A, 130B, until an airlock is formed by the electrolyte 160 blocking airflow from the atmospheric vent to the cell 18 and/or when the electrolyte 160 spilling into the labyrinth of passages 120 reaches a level equal to the electrolyte level 162 in the cells 18A–F. When the battery 10 is tipped onto side 164, the electrolyte 160 remains in the initial passage 126A–F because the electrolyte level in the cells 18A–F is below portions of the path formed by the initial passage 126A–F.

Figure 10:
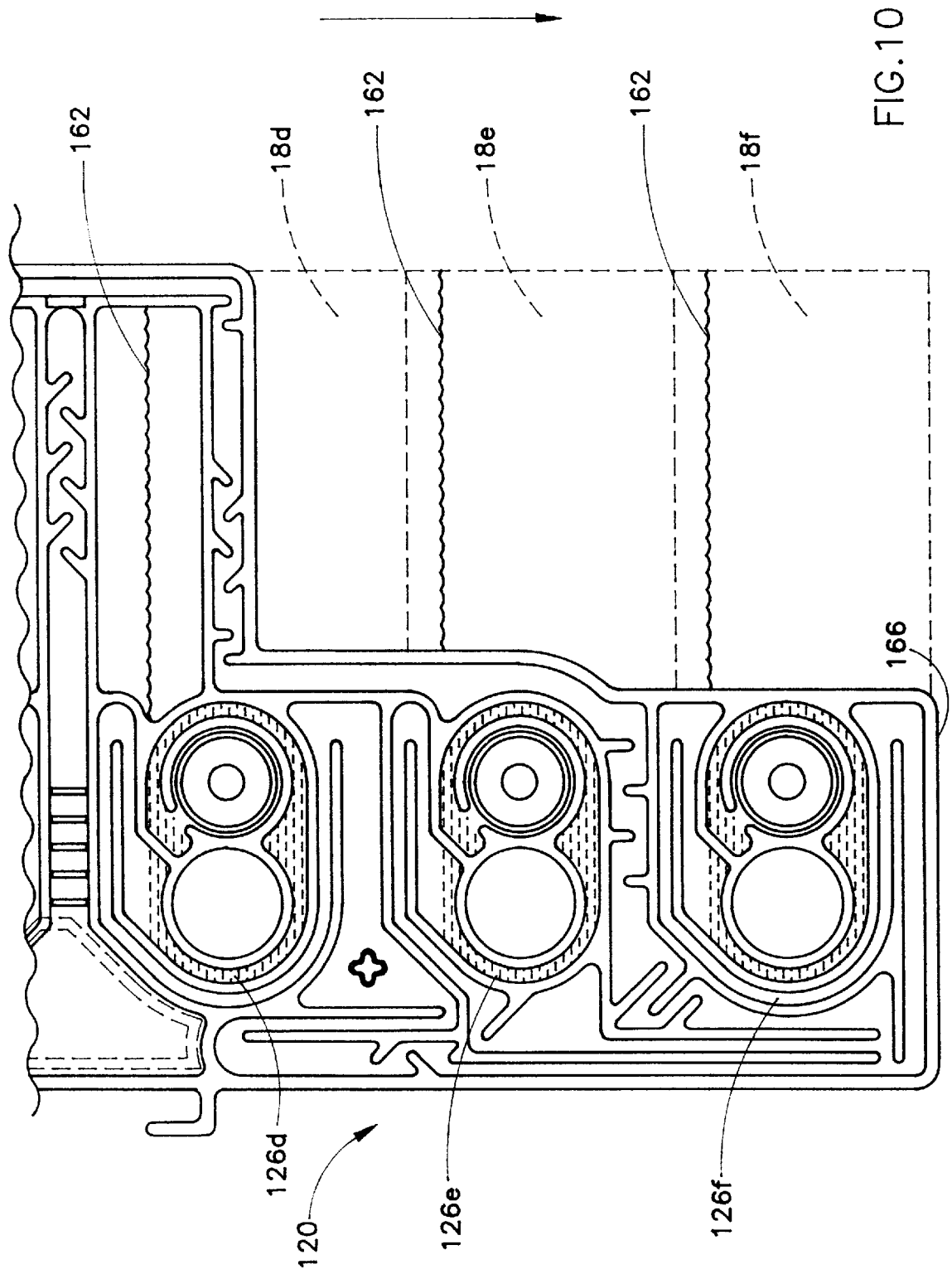
FIG. 10 is a partial cross-sectional view of a battery cover constructed according to the present invention illustrating electrolyte level in the labyrinth of passages when the battery is tipped onto one side in the direction of the arrow.

FIG. 10 depicts the battery 10 tipped onto side 66. As can be seen, the initial passage 126A–F provides a path above the electrolyte level 162 in each cell 18A–F. Thus, the amount of electrolyte 160 spilling into the labyrinth of passages 120 is stopped once a level equal to the level of electrolyte in the cells 18A–F is reached.

Figure 11:
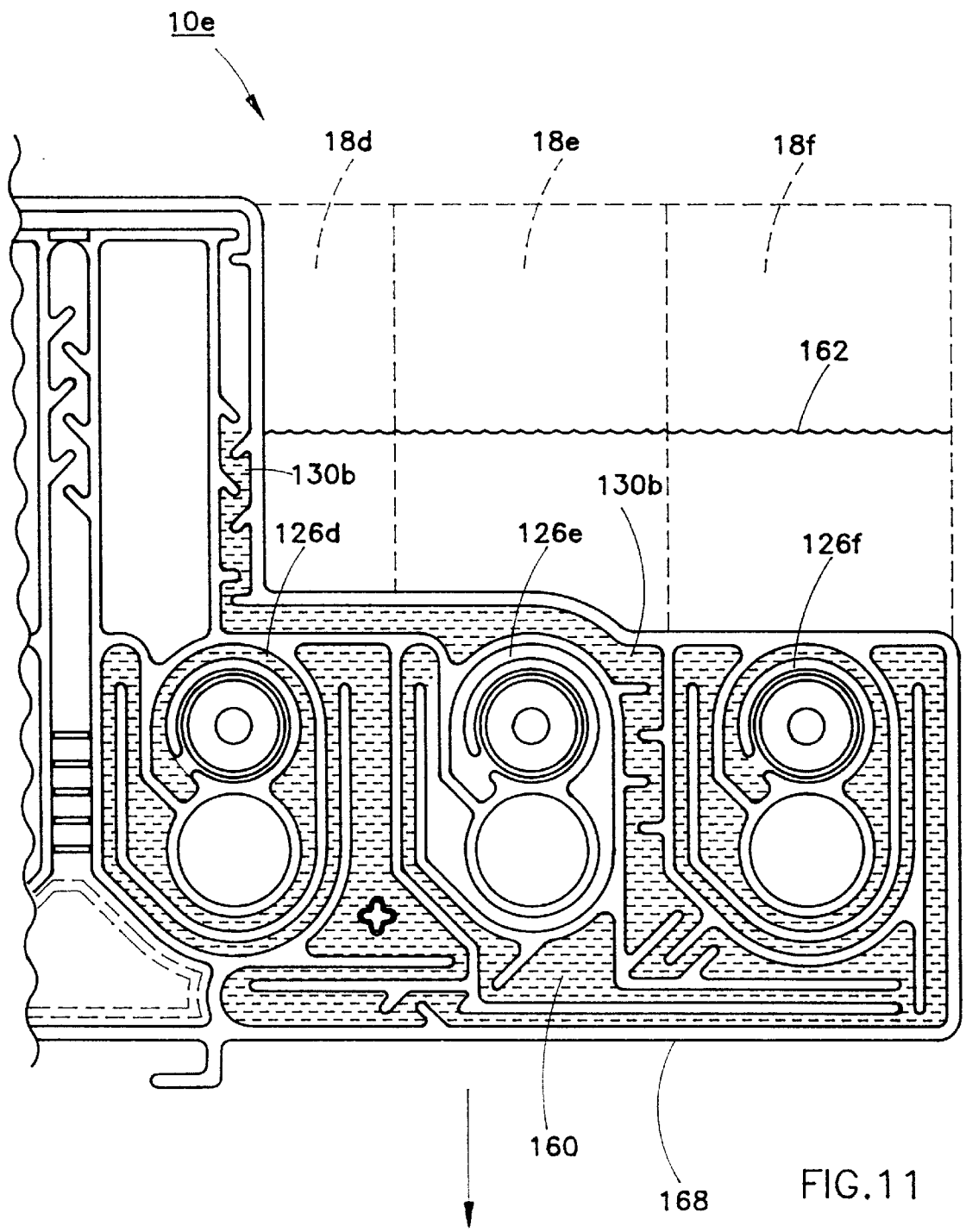
FIG. 11 is a partial cross-sectional view of a battery cover constructed according to the present invention illustrating electrolyte level in the labyrinth of passages when the battery is tipped onto one side in the direction of the arrow.

FIG. 11 depicts the battery 10 tipped onto side 168. As can be seen, the electrolyte level in each cell 18A–F is higher than the level at which most of the labyrinth of passages 120 is located. However, a path above the electrolyte level 162 is provided for each cell. Thus, the electrolyte 160 will never reach a level higher than the electrolyte level 162 in the cells 18A–F. In many instances, an airlock will be formed prior to the electrolyte 160 reaching the level shown in FIG. 11 because of the very convoluted paths formed by the passages 126, 130, 134. These paths provide a substantial hurdle for the electrolyte 160 to overcome in order to reach the atmospheric vent 138. Substantial leak protection is accomplished even during agitation. Given the lack of containment chambers and the use of convoluted, narrow paths applicants' invention provides significant leak protection over existing battery covers.

Figure 12:
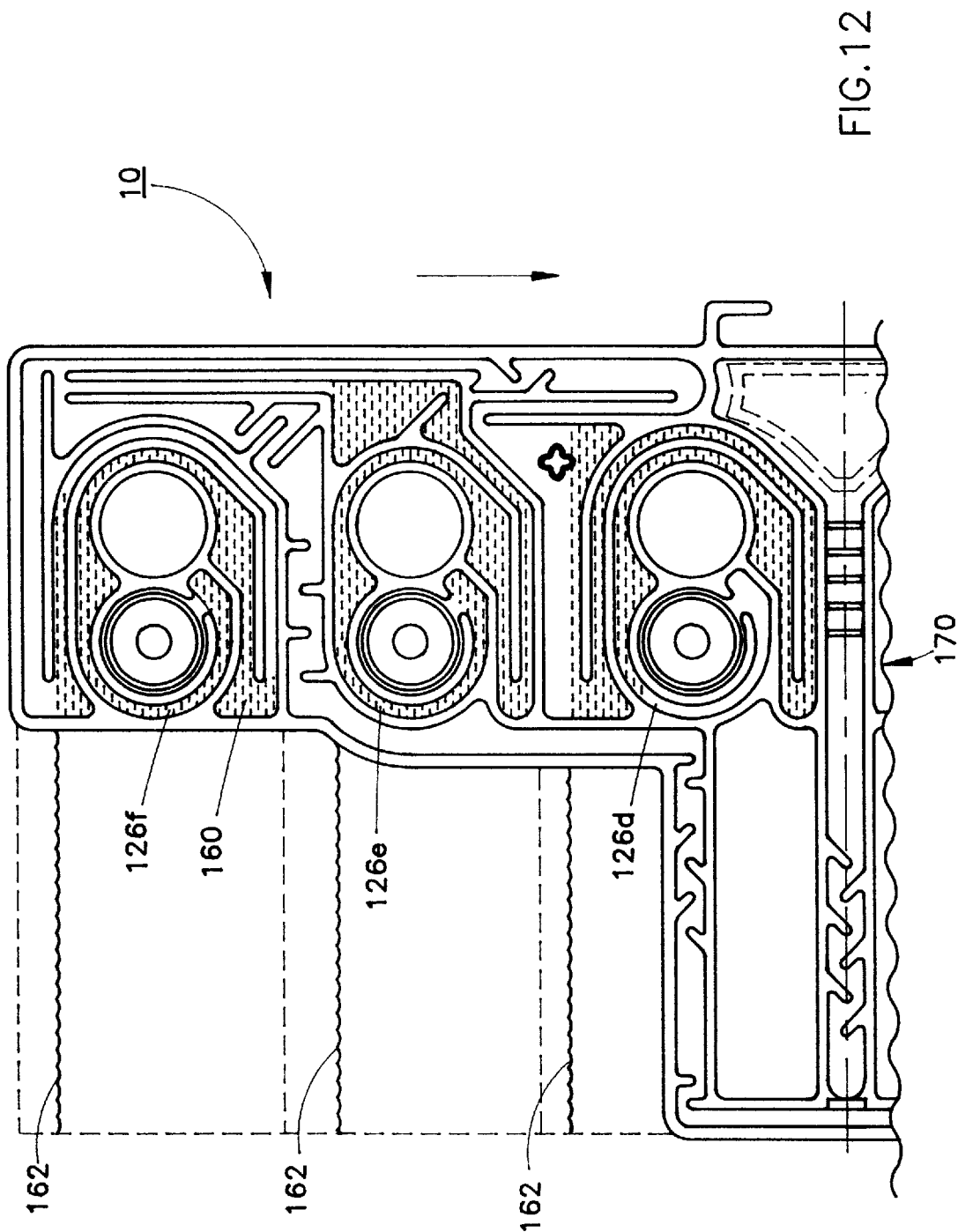
FIG. 12 is a partial cross-sectional view of a battery cover constructed according to the present invention illustrating electrolyte level in the labyrinth of passages when the battery is tipped onto one side in the direction of the arrow.

FIG. 12 depicts the battery 10 tipped onto side 170. Again, the amount of electrolyte 160 spilled into the cover system is substantially limited to the initial passage 126A–F. A path above the cell electrolyte level 162 traps the electrolyte 160. In order for the electrolyte 160 to reach the atmospheric vent, the battery 10 would have to undergo substantial rotation and agitation. The amount of protection provided by the applicants' invention far exceeds those of the prior art in an economical fashion. Not only is the side tipping protection greatly enhanced over the prior art by the applicants' invention, the battery cover also provides substantial leak resistance in an inverted position as well. When the battery covers 114, 116 include the upper and lower vertically extending partitions 146, 150, the covers 114, 116 are virtually leak proof. The alternating vertically extending partitions 146, 150 help develop an airlock between the cell 18A–F and atmospheric vent 138. The effect is further enhanced if the upper vertically extending partitions 150 on the outer cover 116 are increased in length. Typically, the lower vertically extending partitions 150 will extend into the path by more than 50% of the path height. Preferably, the vertically extending partitions 150 extend into the path by more than 75% of the path height. The amount of extension for both the lower and upper vertically extending partitions 146, 150 and the spacing between these partitions 146, 150 are such that liquid electrolyte will not form an airlock when the battery is operating in an upright position.

The covers 114 and 116 provide substantial leak resistance in an inverted position without using the lower and upper vertically extending partitions 146, 150. When inverted, the intricate, convoluted paths formed by the labyrinth of passages 120 in conjunction with the numerous alternating perpendicular and angled horizontally extending partitions 142, 144 will provide a substantial airlock in the paths between the cells 18A–F and the atmospheric vent 138. As seen in FIGS. 4 and 5, ambient air entering the labyrinth of passages 120 will have substantial difficulty in reaching the cells 18A–F through the various convoluted paths associated therewith. Electrolyte will not enter the labyrinth of passages 120 from the cells 18A–F without air being transferred into the cells 18A–F. Thus, providing an extremely difficult path for air to travel through the electrolyte to the cells 18A–F will substantially reduce electrolyte flow from cells 18A–F.

Certain modifications and improvements will occur to those skilled in the art upon a reading of the foregoing description. It should be understood that all such modifications and improvements have been deleted herein for the sake of conciseness and readability but are properly within the scope of the following claims.

We claim:

1. A leak resistant battery cover for a lead acid battery of the type including a housing having at least one cell, said cover comprising:
    a) a cover having a top cover member and a bottom cover member forming an enclosed area therebetween;
    b) an aperture in and extending through said bottom cover member into a cell of the housing, said aperture adapted to communicate gases within the cell to said enclosed area of said cover;
    c) an atmospheric vent in said cover adapted to communicate gases from within said enclosed area of said cover to atmosphere;
    d) a labyrinth of passages formed by a convoluted arrangement of vertical walls extending between said bottom cover member and top cover member within said enclosed area, said labyrinth forming a first convoluted path between said aperture and said atmospheric vent; and
    e) said labyrinth being so arranged that at least one portion of the first convoluted path thereof is at a level above the electrolyte level in said cell when the battery is rotated as much as ninety degrees from an upright position, no matter whether said battery is rotated forwardly, rearwardly, or to either side.

2. The apparatus according to claim 1 wherein said bottom cover member includes a second aperture communicating with the housing and a second convoluted path between said second aperture and said atmospheric vent, said labyrinth forming a portion of said second path wherein said first and second convoluted paths have at least one common passage.

3. The apparatus according to claim 2 wherein said second convoluted path is at least partially formed by first additional convoluted walls extending between said top and bottom of said cover within said interior chamber.

4. The apparatus according to claim 2 wherein said cover includes a third aperture communicating with the housing and a third convoluted path between said third aperture and said atmospheric vent, said labyrinth forming a portion of said third convoluted path wherein said second and third convoluted paths have at least one common passage.

5. The apparatus according to claim 4 wherein said third convoluted path is partially formed by second additional convoluted walls extending between said top and bottom of said cover within said interior chamber.

6. The apparatus according to claim 1 wherein:
    said cover includes a second aperture communicating with the housing and a second path communicating said second aperture to said atmospheric vent, said labyrinthine passage forming a portion of said second path wherein said convoluted path and said second path have a portion in common and said second path is convoluted and at least partially formed by first additional convoluted walls extending between said top and bottom of said cover within said interior chamber; and
    said cover includes a third aperture communicating with the housing and a third path communicating said third aperture to said atmospheric vent, said labyrinthine passage forming a portion of said third path wherein said convoluted path and said third path have a portion in common, and said third path is convoluted and at least partially formed by second additional convoluted walls extending between said top and bottom of said cover within said interior chamber.

7. The apparatus according to claim 1 wherein said cover includes another aperture communicating with the housing and a second path communicating said aperture to a second atmospheric vent, said labyrinthine passage forming a portion of said second path wherein said convoluted path and said second path have a portion in common.

8. The apparatus according to claim 1 wherein said cover includes a second aperture communicating with the housing and a second labyrinthine passage formed by a second convoluted arrangement of vertical walls extending between said bottom and top of said cover within said interior area, said second labyrinthine passage forming a second convoluted path to communicate said aperture to a second atmospheric vent wherein said second aperture communicates substantially immediately with said second labyrinthine passage.

9. The apparatus according to claim 2 wherein all of said convoluted paths are arranged to converge into one final common passage prior to arriving at said atmospheric vent.

10. The apparatus according to claim 1 wherein said passage and said bottom of said housing are sloped toward said aperture to allow liquid electrolyte in said path to flow into the cell.

11. The apparatus according to claim 1 wherein said aperture is a cell vent.

12. The apparatus according to claim 1 wherein said aperture is a cell drain.

13. The apparatus according to claim 1 wherein said aperture is a cell drain and a vent.

14. The apparatus according to claim 8 wherein said cell drain and said cell vent is an integrated vent and drain back unit.

15. The apparatus according to claim 1 wherein said labyrinth includes a plurality of horizontally extending partitions extending into said passage to provide resistance to any flow of liquid towards said atmospheric vent when said battery is toppled.

16. The apparatus according to claim 15 wherein said horizontally extending partitions extend from interior sides of at least one of said passages.

17. The apparatus according to claim 16 wherein said horizontally extending partitions are slanted against a direction of flow of electrolyte toward said atmospheric vent to provide further resistance against the flow of liquid electrolyte towards said atmospheric vent when said battery is toppled.

18. The apparatus according to claim 16 wherein said horizontally extending partitions extend in alternate arrangement from opposing interior sides of said passage of said labyrinth.

19. The apparatus according to claim 17 wherein said horizontally extending partitions alternate from opposing said interior sides of said passages of said labyrinth.

20. The apparatus according to claim 1 wherein each of said paths substantially encircles its corresponding aperture.

21. The apparatus according to claim 1 wherein each of said paths completely encircles its corresponding cell.

22. The apparatus according to claim 1 wherein said battery cover is adapted for a six cell lead acid battery housing, said battery cover having six apertures and one said atmospheric vent, each aperture having an associated convoluted path to said atmospheric vent.

23. The apparatus according to claim 1 wherein said battery cover is constructed of a lower cover portion and an upper cover portion, said lower and upper cover portions sealably engaging one another to form said enclosed area and said labyrinth.

24. The apparatus according to claim 1 wherein said battery cover further includes a second atmospheric vent.

25. The apparatus according to claim 1 wherein said passage has a portion running substantially near a portion of a periphery of said cover.

* * * * *